United States Patent
Hasegawa et al.

(10) Patent No.: US 6,850,522 B2
(45) Date of Patent: Feb. 1, 2005

(54) PACKET BUFFER DEVICE AND PACKET SWITCHING DEVICE

(75) Inventors: Jun Hasegawa, Yokohama (JP); Toshitada Saito, Kawasaki (JP); Yoshimitsu Shimojo, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 951 days.

(21) Appl. No.: 09/745,474

(22) Filed: Dec. 26, 2000

(65) Prior Publication Data

US 2001/0040891 A1 Nov. 15, 2001

(30) Foreign Application Priority Data

Dec. 27, 1999 (JP) .......................................... 11-369431

(51) Int. Cl.⁷ .............................................. H04L 12/28
(52) U.S. Cl. ..................................... 370/390; 370/432
(58) Field of Search ................................ 370/254, 351, 370/400, 401, 408, 412, 428, 432, 392–394, 390, 389

(56) References Cited

U.S. PATENT DOCUMENTS

| | | | | |
|---|---|---|---|---|
| 5,309,433 A | * | 5/1994 | Cidon et al. .............. | 370/390 |
| 5,331,637 A | * | 7/1994 | Francis et al. ............ | 370/408 |
| 5,511,168 A | * | 4/1996 | Perlman et al. ........... | 709/243 |
| 5,602,841 A | * | 2/1997 | Lebizay et al. ........... | 370/413 |
| 5,831,975 A | * | 11/1998 | Chen et al. ............... | 370/256 |
| 6,032,190 A | * | 2/2000 | Bremer et al. ............ | 709/238 |
| 6,101,187 A | * | 8/2000 | Cukier et al. ............. | 370/396 |
| 6,574,194 B1 | * | 6/2003 | Sun et al. ................. | 370/235 |
| 6,778,532 B1 | * | 8/2004 | Akahane et al. .......... | 370/392 |
| 2003/0099198 A1 | * | 5/2003 | Kiremidjian et al. ..... | 370/230.1 |
| 2004/0139150 A1 | * | 7/2004 | McCanne et al. ......... | 709/202 |

FOREIGN PATENT DOCUMENTS

JP 10-145387 5/1998

OTHER PUBLICATIONS

Yoshimitsu Shimojo, et al., "A 622Mbps ATM Switch Access LSI with Multicast Capable Per–VC Queueing Architecture", IEEE ATM Workshop, May 1999, pp. 373–378.

Jun Hasegawa, et al., "An Implementation of Scheduler in ATM Switch", Technical Report of IEICE SSE99–33, RCS99–57, Jul. 1999, pp. 19–24.

* cited by examiner

Primary Examiner—Hassan Kizou
Assistant Examiner—Gregory Sefcheck
(74) Attorney, Agent, or Firm—Oblon, Spivak, McClelland, Maier & Neustadt, P.C.

(57) ABSTRACT

In respective leaf tables (LT(1) to LT(m)) of a coupling management table (20), there are provided delete operation identifiers (D(1) to D(m)) indicating that leaf queues (LQ) respectively next to them toward the upstream direction are under delete operation. When one of the leaf queues (LQ(n)) should be deleted, if the leaf queue (LQ(n)) to be deleted stores any element, the delete operation identifier (D(n+1)) is set to 1. Thereby, the leaf table (LT(n–1)) can acknowledge that the leaf queue (LQ(n)) is currently under delete operation. Therefore, the coupled packet queue after deletion of the leaf queue and the coupling management table can be maintained consistent.

19 Claims, 10 Drawing Sheets

PACKET BUFFER DEVICE AND PACKET SWITCHING DEVICE

CROSS REFERENCE TO RELATED APPLICATION

This application claims benefit of priority under 35 U.S.C. § 119 to Japanese Patent Application No. H11-369431, filed on Dec. 27, 1999, the entire contents of which are incorporated by reference herein.

BACKGROUND OF THE INVENTION

1. Field of the Invention

This invention relates to a packet buffer device and a packet switching device that once store and then transfer input packets, and more particularly, to a packet buffer device and a packet switching device for realizing the function of delivering packets to a plurality of destinations.

2. Description of the Related Background Art

Japanese Patent Laid-Open Publication No. H 10-145387 discloses a packet buffer device in which the queue access throughput does not depend on the number of destinations. FIG. 8 is a block diagram showing a part of the interior structure of a packet switching device using a packet buffer device disclosed in that publication.

As shown in FIG. 8, formed inside the packet buffer device 100 are one or more packet queues 110 and one or more coupled packet queues 112. Which packet queue each input packet is stored in is determined based on the header of the packet. Each of packets stored in these packet queues 110 are outputted to one of output ports #1 through #4 via a bus 120 in accordance with an instruction from a scheduler (not shown), and then sent from the output port #1 through #4. In ATM (asynchronous transfer mode) communication, these packets are called ATM cells.

In the existing packet buffer device 100, its multi-casting function was realized by the process explained below. The "multi-casting function" herein pertains to a function of transferring common contents to a plurality of destinations.

FIG. 9 is a diagram that explains broadcasting packet processing for realizing a multi-casting function, which is executed inside the packet buffer device 100.

As shown in FIG. 9, packets introduced into a packet allocator 130 provided in the packet buffer device 100 are allotted based on headers contained in respective packets. In the case where these packets are broadcasting packets for realizing a multi-casting function, they are stored in corresponding one of the coupled packet queues 112 prepared for each flow.

The "flow" herein pertains to a set of packets composing a common multi-casting. For example, in FIG. 9, the coupled packet queue 112 (1) is a queue for the flow consisting of copy destinations CP1, CP2, CP3 and CP4, the coupled packet queue 112(2) is a queue for the flow consisting of copy destinations CP5 and CP6, and the couples packet queue 112(3) is a queue for the flow consisting of copy destinations CP7, CP8 and CP9. In this manner, in the packet buffer device 100, multi-casting trees corresponding to the number of flows concurrently exist, overlapping one another. Considering uni-casting as a particular multi-casting having only one destination, ordinary packet queue 110 can be regarded as a coupled packet queue 112.

Next taking the coupled packet queue 112(1) as an example, its operation is explained. As shown in FIG. 9, the packet allocator 130 analyzes the header of an inputted packet. Assuming that the inputted packet is one to be stored in the coupled packet queue 112(1), the packet allocator 130 inputs this packet as one element at the uppermost stream of the coupled packet queue 112(1). That is, the element is stored at the tail of the leaf queue LQ(1) of the copy destination CP1 in the coupled packet queue 112(1).

The packet stored at the tail of the leaf queue LQ(1) of the copy destination CP1 eventually comes to the leading head of the leaf queue LQ(1) of the copy destination CP1, and it is sent out from the output port as a packet for the copy destination CP1. The packet, sent out, is stored at the tail of the leaf queue LQ(2) of the copy destination CP2 in the coupled packet queue 112(1). Similarly, this packet eventually comes to the leading head of the leaf queue LQ(2) of the copy destination CP2, it is sent out from the output port as a packet for the copy destination CP2, and stored at the tail of the leaf queue LQ(3) of the copy destination CP3 in the coupled packet queue 112(1). By repeating these procedures, the packet is sent out also from the copy destinations CP3 and CP4, and removed from the coupled packet queue 112(1).

Thus, the existing packet buffer device 100 realized the multi-casting function by making individual leaf queues LQ for respective copy destinations forming respective flows in coupled packet queues 112 prepared for individual flows.

In this multi-casting function, however, it may be desirable or necessary to erase one or more copy destinations forming a flow, such as the case where a user doing a multi-casting communication finishes this multi-casting communication. In this case, the leaf queue LQ of the corresponding copy destination has to be deleted from the coupled packet queue 112.

Referring to FIG. 9, in case of deleting the copy destination CP2 from the coupled packet queue 112(1), the leaf queue LQ connected next to the leaf queue LQ(1) of the copy destination CP1 is changed from the leaf queue LQ(2) of the copy destination CP2 to the leaf queue LQ(3) of the copy destination CP3. That is, a packet sent out from the leaf queue LQ(1) of the copy destination CP1 is accumulated at the tails of the leaf queue LQ(3) of the copy destination CP3.

If any packet is accumulated in the leaf queue LQ(2) of the copy destination CP2, it is necessary to continue egress of packets from the leaf queue LQ(2) of the copy destination CP2 and accumulate the sent-out packets in the leaf queue LQ(3) of the copy destination CP3. In this manner, by evacuating all packets from the leaf queue LQ(2) to be deleted, the packet buffer device 100 maintained consistency inside.

The existing packet buffer device, however, involved the following problems.

First referring to FIG. 10, in the case where no packets have ever been accumulated in the next leaf queue LQ(n+1) upon deleting the leaf queue LQ(n), the header pointer of the leaf queue LQ(n+1) is still indefinite, and packets of the leaf queue LQ(n) cannot be changed to the leaf queue LQ(n+1).

This problem is explained below in greater detail with reference to FIG. 11. FIG. 11 is a diagram that shows elements P100 through P103 accumulated in the coupled packet queue 112, and (n−1)th through (n+1)th coupling management tables for managing the coupled packet queue 112.

As shown in FIG. 11, since no element has ever been accumulated in the leaf queue LQ(n+1), the head pointer H(n+1) of the (n+1)th leaf table is still indefinite. In ordinary operation not deleting the leaf queue LQ(n+1), since the head pointer H(n+1) points the element P100 upon transfer of the element P100 of the leaf queue LQ(n) to the leaf queue LQ(n+1), the head pointer H(n+1) is defined at that time. As a result, the element P100 heretofore located at the leading of the leaf queue LQ(n) becomes the tail element of the leaf queue LQ(n+1) (it is also the leading element because it is the only one element of the leaf queue LQ(n+1)). Further, the head pointer H(n) of the n-th leaf table for the leaf queue LQ(n) points the element P101.

On the other hand, in case of deleting the leaf queue LQ(n), he leaf queue LQ(n−1) executed the same processing to the leaf queue LQ(n+1). That is, upon transferring the element P102 from the leaf queue LQ(n−1) to the leaf queue LQ(n+1), the head pointer H(n+1) of the (n+1)th leaf table for the leaf queue LQ(n+1) points the element P102, and the head pointer H(n+1) is then determined. However, once the head pointer H(n+1) points the element P102 heretofore located at the leading of the leaf queue LQ(n−1), the elements P100 and P101 accumulated in the leaf queue LQ(n) cannot be transferred to the leaf queue LQ(n+1). That is, the elements P100 and P102 accumulated in the leaf queue LQ(n) cannot be coupled by using the head pointer H(n+1) and the inter-element link pointer.

Thus the existing packet buffer device 100 involved the problem that connection of packets of the leaf queue LQ(n) could not be changed to the leaf queue LQ(n+1) if no packets had ever been accumulated in the next leaf queue LQ(n+1) upon deleting the leaf queue LQ(n), because the head pointer of the leaf queue LQ(n+1) was not determined.

Second, as shown in FIG. 12, the existing packet buffer device had the problem that, upon deleting the leaf queue LQ(n) located at the downstream end of the coupled packet queue 112, when all of the upper-stream leaf queues LQ(1) through LQ(n−1) were empty, the tail pointer of the coupled packet queue 112 exhibited an abnormality.

This problem is explained below in greater detail with reference to FIG. 13. FIG. 13 is a diagram that shows elements P110 through P112 accumulated in the coupled packet queue 112, and coupling management tables and a root table for managing the coupled packet queue 112. As shown in FIG. 13, the tail pointer T provided in the root table points the element P112 at the tail of the coupled packet queue 112. If any element remains in the leaf queues LQ(1) through LQ(n−1) other than the leaf queue LQ(n) at the downstream end, the tail pointer T does not become indefinite, and no problem occurs.

If, however, the leaf queues LQ(1) through LQ(n−1) other than the leaf queue LQ(n) to be deleted have no accumulated elements, a problem occurs for the following reason. That is, in this case, the tail pointer T points the element "that was the tail" of the leaf queue LQ(n−1). This means that the tail pointer T points the element already released.

Under such condition, since the total information C in the root table of elements having been accumulated in the coupled packet queue 112 is not zero, the packet buffer device 100 cannot recognize that the tail pointer T is currently indefinite. Therefore, the packet buffer device 100 results in linking a packet newly arriving packet at the coupled packet queue 112 to the element pointed by the tail pointer T. In other words, the device 100 links the new packet to the element already released. Linking the packet in this manner, two links are formed for a single element, i.e. the link of the coupled packet queue 112 and the link of the released list. Therefore, if the element is re-used for linkage of another element, the linked element is destroyed. Even when it has not been used heretofore, it will be re-used eventually, the link currently using the element that was once released will be destroyed.

Thus, the existing packet buffer device 100 had the problem that, when elements remained only in the leaf queue LQ(n) and the leaf queue LQ(n) was deleted, the packet buffer device 100 erroneously recognized that the tail pointer was definite even though no elements actually remained.

Moreover, the situations as shown in FIGS. 10 and 12 can often occur when there is any trouble in the output of the copy destination to be deleted, because elements cannot be sent out to that copy destination.

SUMMARY OF THE INVENTION

It is therefore an object of the invention to provide a packet buffer device capable of reliably maintaining the entire consistency even when the leaf queue of a copy destination is deleted from a coupled packet queue. That is, it is the object of the invention to provide a packet buffer device ensuring adequate processing even upon a change in condition of a packet queue. It is a further object of the invention to provide a packet switching device using such a packet buffer device.

In order to accomplish the aforementioned and other objects, according to one aspect of the present invention, a packet buffer device comprising:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially send out from the copy destinations belonging to the common flow;

a coupling management table having plurality of leaf tables individually associated with and prepared for the individual leaf queues to manage elements accumulated in the coupled packet queue; and a detector configured to cause the leaf table, which is associated with the leaf queue located next to the leaf queue to be deleted toward the upstream direction, to detect that the leaf queue to be deleted next toward the downstream direction is under delete operation, when the leaf queue to be deleted is performed a deleting process.

According to another aspect of the present invention, a packet buffer device comprising:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially send out from the copy destinations belonging to the common flow;

a coupling manager configured to manage elements accumulated in the coupled packet queue and having a total number information storage to be stored the total number of elements accumulated in the coupled packet queue; and a subtractor configured to subtract the number of elements accumulated in the leaf queue to be deleted from the total number information stored in the total number information storage, when the leaf queue to be deleted is located at the downstream end of the coupled packet queue and the leaf queue to be deleted is performed a deleting process.

According to a further aspect of the present invention, a packet switching device comprising:

a routing switch configured to switch each inputted packet, based on header information contained in the packet; and at least one packet buffer device provided in front stage and/or rear stage of the routing switch, wherein the packet buffer device including:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially send out from the copy destinations belonging to the common flow;

a coupling management table having a plurality of leaf tables individually associated with and prepared for the individual leaf queues to manage elements accumulated in the coupled packet queue; and a detector configured to cause the leaf table, which is associated with the leaf queue located next to the leaf queue to be deleted toward the upstream direction, to detect that the leaf queue to be deleted next toward the downstream direction is under delete operation, when the leaf queue to be deleted is performed a deleting process.

According to a still further aspect of the present invention, a packet switching device comprising:

a routing switch configured to switch each inputted packet, based on header information contained in the packet; and at least one packet buffer device provided in front stage and/or rear stage of the routing switch, wherein the packet buffer device including:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially send out from the copy destinations belonging to the common flow;

a coupling manager configured to manage elements accumulated in the coupled packet queue and having a total number information storage to be stored the total number of elements accumulated in the coupled packet queue; and a subtractor configured to subtract the number of elements accumulated in the leaf queue to be deleted from the total number information stored in the total number information storage, when the leaf queue to be deleted is located at the downstream end of the coupled packet queue and the leaf queue to be deleted is performed a deleting process.

DETAILED DESCRIPTION OF THE PREFERRED EMBODIMENTS

The packet buffer device according to an embodiment of the invention has its feature in providing each leaf table and each root table of a coupling management table for managing a coupled packet queue with a delete operation identifier indicating that a preceding leaf queue is under delete operation, and thereby ensuring consistency of the coupled packet queues and the coupling management table after deletion of the leaf queue. It is explained below in greater detail.

Figure 1:
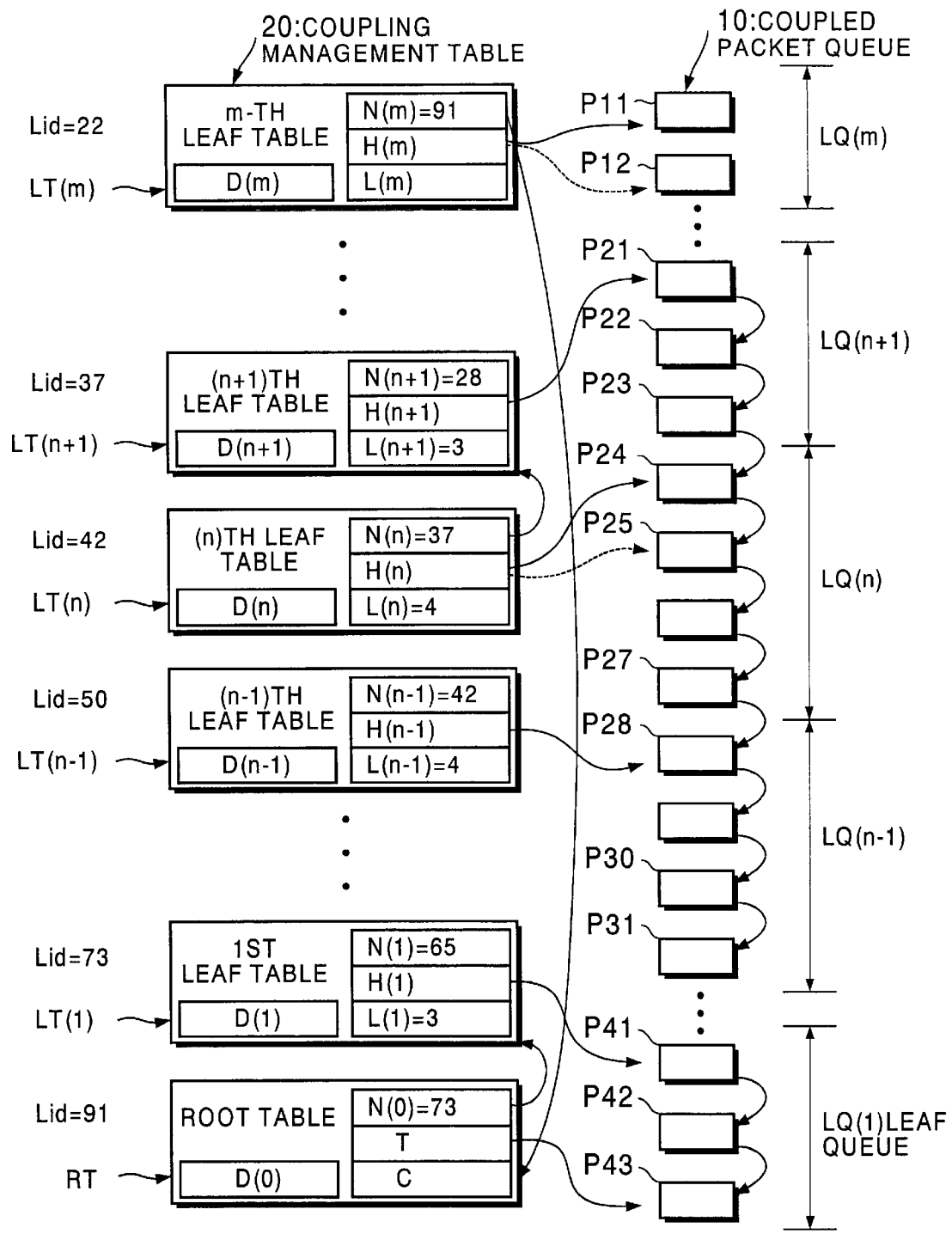
FIG. 1 is a block diagram that shows configuration of a coupled packet queue and a coupling management table in a packet buffer device according to an embodiment of the invention.

FIG. 1 is a block diagram that shows configuration of a coupled packet queue 10 and a coupling management table 20 for managing the entirety of the coupled packet queue 10 in a packet buffer device according to an embodiment of the invention.

In the example shown in FIG. 1, the coupled packet queue 10 of a certain flow is composed of m leaf queues LQ(1) through LQ(m). That is, in this example, multi-casting made up of m copy destinations is formed. In this embodiment, the leaf queues LQ(1) through LQ(m) do not store packets themselves, but store pointer blocks for those packets. Each pointer block is made up of a memory address of the memory space storing a corresponding packet and a link pointer to the next pointer block. In the explanation made below, leaf queues LQ(1) through LQ(m) are expressed to store "elements". Actually, however, the leaf queues LQ(1) through LQ(m) may be configured to store packet data themselves as the elements.

As shown in FIG. 1, the leaf queue LQ(m) located at the downstream end stores elements P11 and P12. The leaf queue LQ(n+1) stores elements P21 through P23. The leaf queue LQ(n) stores elements P24 through P27. The leaf queue LQ(n−1) stores elements P28 through P31. The leaf queue LQ(1) located at the upstream end stores elements P41 through P43.

The coupling management table 20 includes a root table RT and leaf tables LT(1) through LT(m). The leaf tables T(1) through LT(m) are associated with the leaf queues (LQ(1) through LQ(m), respectively. That is, each leaf table LT is provided for each copy destination.

Configuration of the leaf tables LT(1) through LT(m) is explained, taking the leaf table LT(n) as an example. The leaf table LT(n) contains a head pointer H(n), a length pointer L(n), a next pointer N(n) and a delete operation identifier D(n).

The head pointer H(n) is a pointer that points the leading of the leaf queue LQ(n). In the example of FIG. 1, it points the element P24. The length pointer L(n) is a pointer that shows the number of elements stored in the leaf queue LQ(n). In the example of FIG. 1, since the leaf queue LQ(n) stores four elements P24 through P27, the length pointer L(n) indicates 4.

The next pointer N(n) is a pointer that points the leaf table LT(n+1) at the next stage (n+1). In this embodiment, the leaf tables LT(1) through LT(m) are identified by a leaf identifier Lid. Therefore, the next pointer N(n) points the leaf identifier 37 of the next leaf table TL(n+1).

The delete operation identifier D(n) is an identifier indicating that the leaf queue LQ(n−1) at the preceding (n−1) stage is under delete operation. That is, the delete operation identifier D(n) is 1 while the leaf queue LQ(n−1) at the preceding (n−1) stage is under delete operation whereas it is "0" otherwise.

The root table RT includes a top leaf pointer N(0), a tail pointer T, total number information C and a delete operation identifier D(0). The top leaf pointer N(0) is a pointer that points the first leaf table LT(1). In the example shown in FIG. 1, since the leaf identifier Lid of the leaf table TL(1) is 73, the top leaf pointer N(0) indicates 73.

The tail pointer T is a pointer that points the element located at the tail of the coupled packet queue 10, i.e., at the upstream end. In the example of FIG. 1, the tail pointer T points the element P43 stored in the coupled packet queue 10.

The total number information C shows the total number of elements stored in the coupled packet queue 10. The delete operation identifier D(0) is an identifier that shows whether the leaf queue LQ(m) at the downstream end is under delete operation or not. That is, the delete operation identifier D(0) is 1 when the leaf queue LQ(m) at the downstream end is under delete operation, and "0" otherwise.

The next pointer N(m) of the leaf table LT(m) located at the rear end indicates the root table RT. In the example of FIG. 1, since the leaf identifier Lid of the root table is 91, the next pointer N(m) indicates 91.

Next explained is the operation executed upon arrival of a multi-casting packet at the packet buffer device, with reference to FIG. 1.

In the case where a multi-casting packet arrives at the packet buffer device, the packet allocator allocates the packet with reference to its header. Assume here that the multi-casting packet has been allocated to the coupled packet queue 10. Then the packet allocator adds the new packet to the upstream end of the coupled packet queue 10. That is, it adds the new element next to the element P43 at the rear end of the leaf queue LQ(1) located at the upstream end.

Accordingly, the coupling management table 20 undergoes necessary renewal. That is, the tail pointer T in the root table RT is changed, and the total number information C is counted up by one. Additionally, the length pointer L(1) in the first-stage leaf table LT(1) is counted up by one.

Next explained is the operation executed for outputting a single packet (element) from a single leaf queue LQ(n) and transferring it to the next leaf queue LQ(n+1).

In the case where an element is outputted from the leaf queue LQ(n), the element pointed by the head pointer H(n) of the leaf table LT(n) is outputted. That is, the leading element of the leaf queue LQ(n) is outputted. In the example of FIG. 1, the element P24 of the leaf queue LQ(n) is outputted. Then, the element P24 is transferred to the next leaf queue, i.e. leaf queue LQ(n+1).

Upon the transfer of the element, the pointer chain of elements of the coupled packet queue 10 need not be rewritten. It is sufficient to change the head pointer H(n) of the leaf table LT(n) to indicate the element P25, count down the length pointer L(n) by one and simultaneously count up the length pointer L(n+1) of the leaf table LT(n+1) by one. That is, according to this embodiment, since all queues of a common flow are collectively arranged as leaf queues LQ in a common coupled packet queue 10, transfer of an element (packet) from one leaf queue LQ to another is attained by merely changing the pointer of the coupling management table 20.

Next explained is the operation executed when a single element (packet) is outputted from the leaf queue LQ(m) located at the downstream end of the coupled packet queue 10.

In the case where an element is outputted from the leaf queue LQ(m), this element need not be transferred to the next leaf queue. Therefore, this element is deleted from the pointer chain of the coupled packet queue 10 after being outputted. In the example of FIG. 1, the head pointer H(m) of the leaf table LT(m) is changed to point the element P12, the length pointer L(m) is counted down by one, and the total number information C of the root table RT is simultaneously counted down by one.

Figure 2:
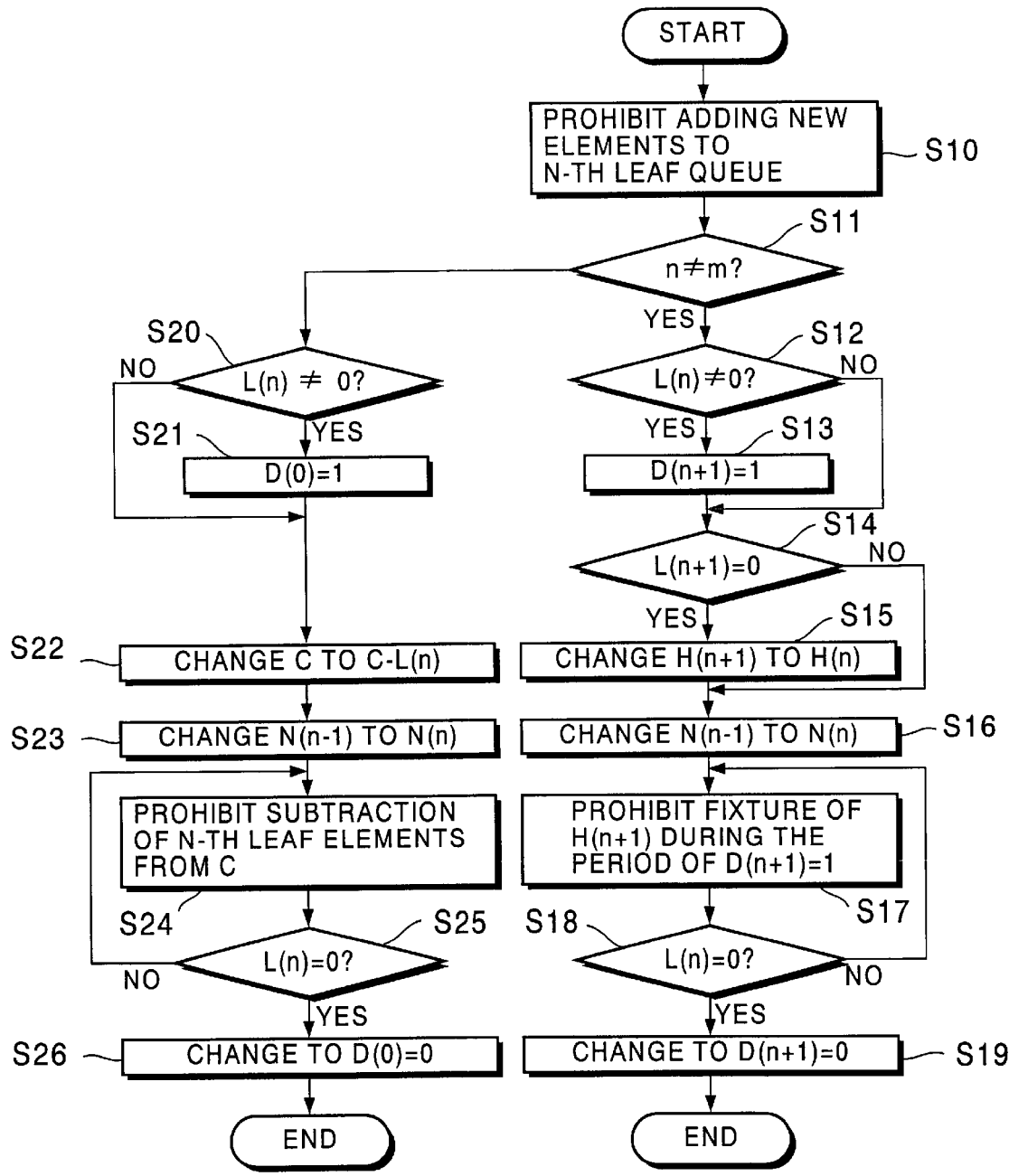
FIG. 2 is a flowchart that shows procedures for deleting a leaf queue.

Next explained is the operation executed upon deleting a single leaf queue LQ from the coupled packet queue 10, with reference to FIG. 2. FIG. 2 is a flow chart of procedures for deleting a single leaf queue LQ from the coupled packet queue 10. Shown in FIG. 2 are procedures taken upon deleting the n-th leaf queue LQ(n) and deleting the leaf table LT(n).

The packet buffer device first prohibits addition of a new element to the n-th leaf queue LQ(n) (step S10). This is because, if elements increases in the leaf queue LQ(n) to be deleted, the number of elements in the leaf queue LQ(n) does not becomes zero. Therefore, the packet buffer device prohibits any increase of elements in the n-th leaf queue LQ(n).

After that, the packet buffer device judges whether "n" is unequal to "m" or not (step S11). That is, it judges whether the leaf queue LQ(n) to be deleted is certainly the leaf queue located at the downstream end of the coupled packet queue 10.

If the leaf queue LQ(n) to be deleted is not the leaf queue located at the downstream end (step S11: yes), it is judged whether the length pointer L(n) of the leaf table LT(n) corresponding to the leaf queue LQ(n) to be deleted is not "0" (step S12). If the length pointer L(n) of the leaf table LT(n) is not "0" (step S12: yes), the delete operation identifier D(n+1) of the next leaf table LT(n+1) is set to 1 (step S13). Thereby, it is possible to inform the preceding leaf table LT(n−1) to be deleted that the leaf table LT(n) is currently under delete operation.

On the other hand, if the length pointer L(n) of the leaf table LT(n) is "0" (step S12: no), the procedure of the step S13 is bypassed. Therefore, when the length pointer L(n) of the leaf table LT(n) is "0", the delete operation identifier D(n+1) remains "0".

After that, the packet buffer device judges whether the length pointer L(n+1) of the next leaf table LT(n+1) to be deleted is "0" or not (step S14). If the length pointer L(n+1) of the leaf table LT(n+1) is "0" (step S14: yes), information of the head pointer H(n+1) is changed into information of the head pointer H(n) (step S15). This is because, if the length pointer L(n+1) of the next (n+1)th leaf table LT(n+1) is "0", it is possible that no elements have ever been stored in the leaf queue LQ(n+1). In the case where no elements have ever been stored, the head pointer H(n+1) of the (n+1)th leaf table LT(n+1) may possibly remain indefinite. Transferred to this (n+1)th leaf queue LQ(n+1) are elements from both the leaf queue LQ(n) and the leaf queue LQ(n−1). Therefore, if the head pointer H(n+1) is left indefinite, it may occur that the head pointer H(n+1) is determined as indicating the element transferred from the leaf queue LQ(n−1) and the element transferred from the leaf queue LQ(n) cannot be connected to this. Having the likeliness of the pointer chain of the coupled packet queue 10 being broken, this embodiment forcibly fixes the head pointer H(n+1) at the leading of the leaf queue LQ(n) by substituting the information of the head pointer H(n) of the (n)th leaf table LT(n) into the head pointer H(n+1) of the (n+1)th leaf table LT(n+1), and thereby links the element of the leaf queue LQ(n+1) to the coupled packet queue 10.

On the other hand, if the length pointer L(n+1) of the leaf table LT(n+1) is not "0" (step S14: no), since the head pointer H(n+1) is already determined, the procedure of step S15 is bypassed. That is, the head pointer H(n+1) is left as it is.

Figure 3:
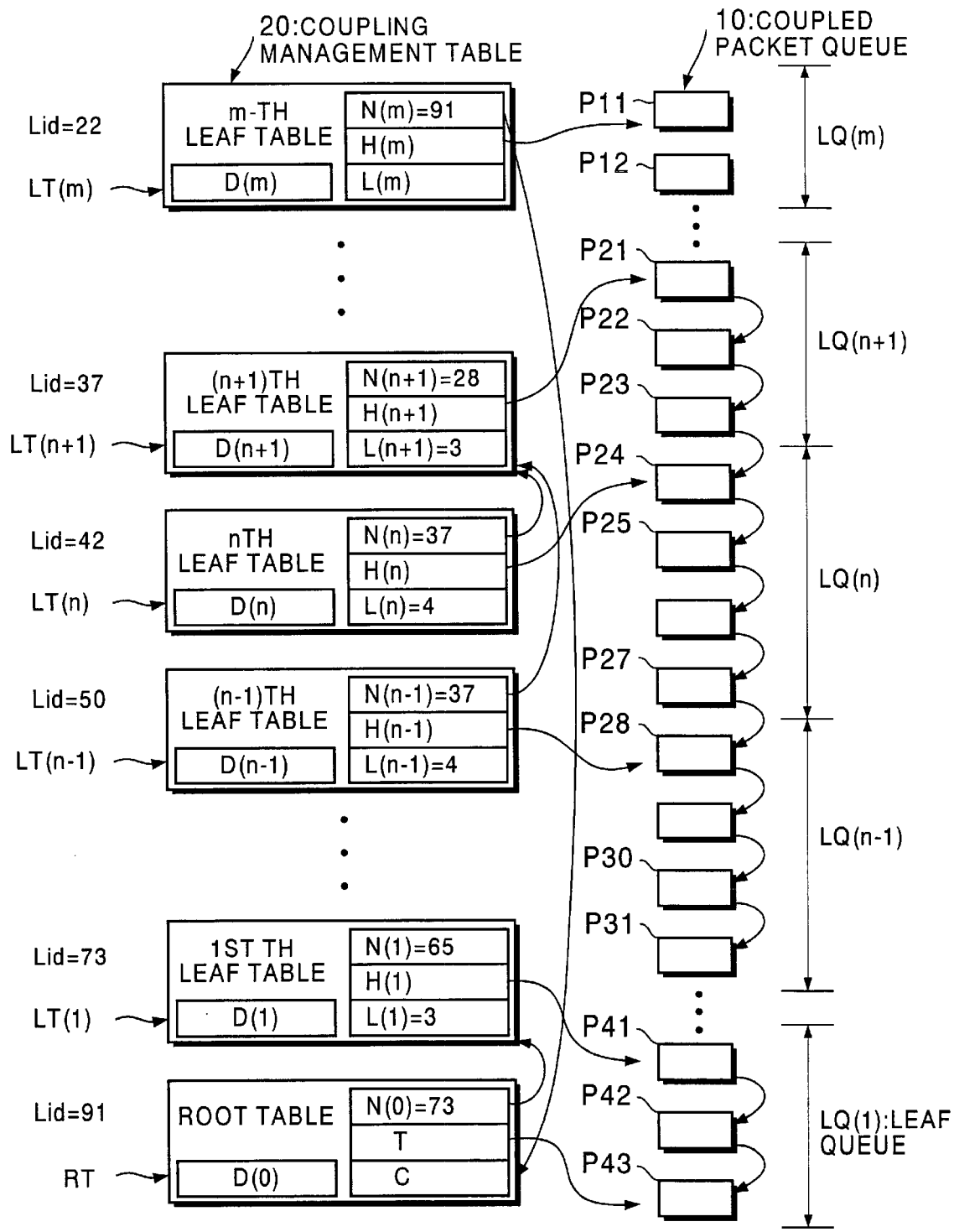
FIG. 3 is a diagram that shows the status after re-connecting the (n−1)th leaf queue to the (n+1)th leaf queue for the purpose of deleting the n-th leaf queue in the packet buffer device shown in FIG. 1.

After that, for the purpose of deleting the n-th leaf queue LQ(n) from the coupled packet queue 10, the packet buffer device changes information of the next pointer N(n−1) of the preceding leaf table LT(n−1) to be deleted to information of the next pointer N(n) of the leaf table LT(n) (step S16). FIG. 3 is a diagram that shows the status after this processing to the coupled packet queue 10 of FIG. 1. As shown in FIG. 3, in this example, the next pointer N(n−1) of the leaf table LT(n−1) is replaced with 37 that is the value of the next pointer N(n) of the leaf table LT(n). This results in connecting the leaf table LT(n−1) to the leaf table LT(n+1).

At this time, the head pointer H(n+1) of the (n+1)th leaf table LT(n+1) is already fixed, and it does not become indefinite unless the total number of elements of the coupled packet queue 10 becomes "0", i.e., C=0. Additionally, since the delete operation identifier D(n+1) is 1 unless the length pointer L(n) is "0", C does not become "0" as long as the delete operation identifier D(n+1) remain 1. Accordingly, the head pointer H(n+1) of the (n+1)th leaf table LT(n+1) does not become indefinite. Therefore, in the period where the delete operation identifier D(n+1)=1, renewal of the element of the head pointer H(n+1) is prohibited (step S17), and it is prohibited that the element of the (n−1)th leaf queue LQ(n−1) is written in the head pointer H(n+1). That is, it is prohibited that link pointer of the element of the head pointer H(n+1) is changed to the leading element of the leaf queue LQ(n−1).

After that, the packet buffer device judges whether the length pointer L(n) of the leaf queue LQ(n) to be deleted has become "0" or not (step S18). If the length pointer L(n) has not yet become "0" (step S18: no), the packet buffer device holds the status of step S17. Meanwhile, elements stored in the leaf queue LQ(n) are sequentially sent out therefrom and transferred to the leaf queue LQ(n+1).

In step S18, when the length pointer L(n) becomes "0" (step S18: yes), the delete operation identifier D(n+1) is returned to "0" (step S19), and the process of deleting the leaf queue LQ(n) is completed.

On the other hand, in step S11, if "n" equals "m" (step S11: no), which means the leaf queue LQ(n) to be deleted is the leaf queue located at the downstream end, it is judged whether the length pointer L(n) of the leaf table LT(n) corresponding to the leaf queue LQ(n) to be deleted is not "0" (step S20). If the length pointer L(n) of the leaf table LT(n) is not "0" (step S20: yes), the delete operation identifier D(0) of the root table RT is set to "1" (step S21). Thereby, it is possible to inform the preceding leaf table LT(n−1) to be deleted through the root table RT that the leaf table LT(n) is currently under delete operation.

On the other hand, if the length pointer L(n) of the leaf table LT(n) is "0" (step S20: no), the procedure of the step S21 is bypassed. Therefore, when the length pointer L(n) of the leaf table LT(n) is "0", the delete operation identifier D(0) remains 0.

After that, the packet buffer device subtracts the length pointer L(n) of the leaf table LT(n) to be deleted from the total number information C of the root table RT (step S22). Since the leaf queue LQ(n) located at the downstream end is never connected to the next leaf queue, the total number information C of elements of the coupled packet queue 10 can be maintained properly by direct subtraction of the number of elements.

Figure 4:
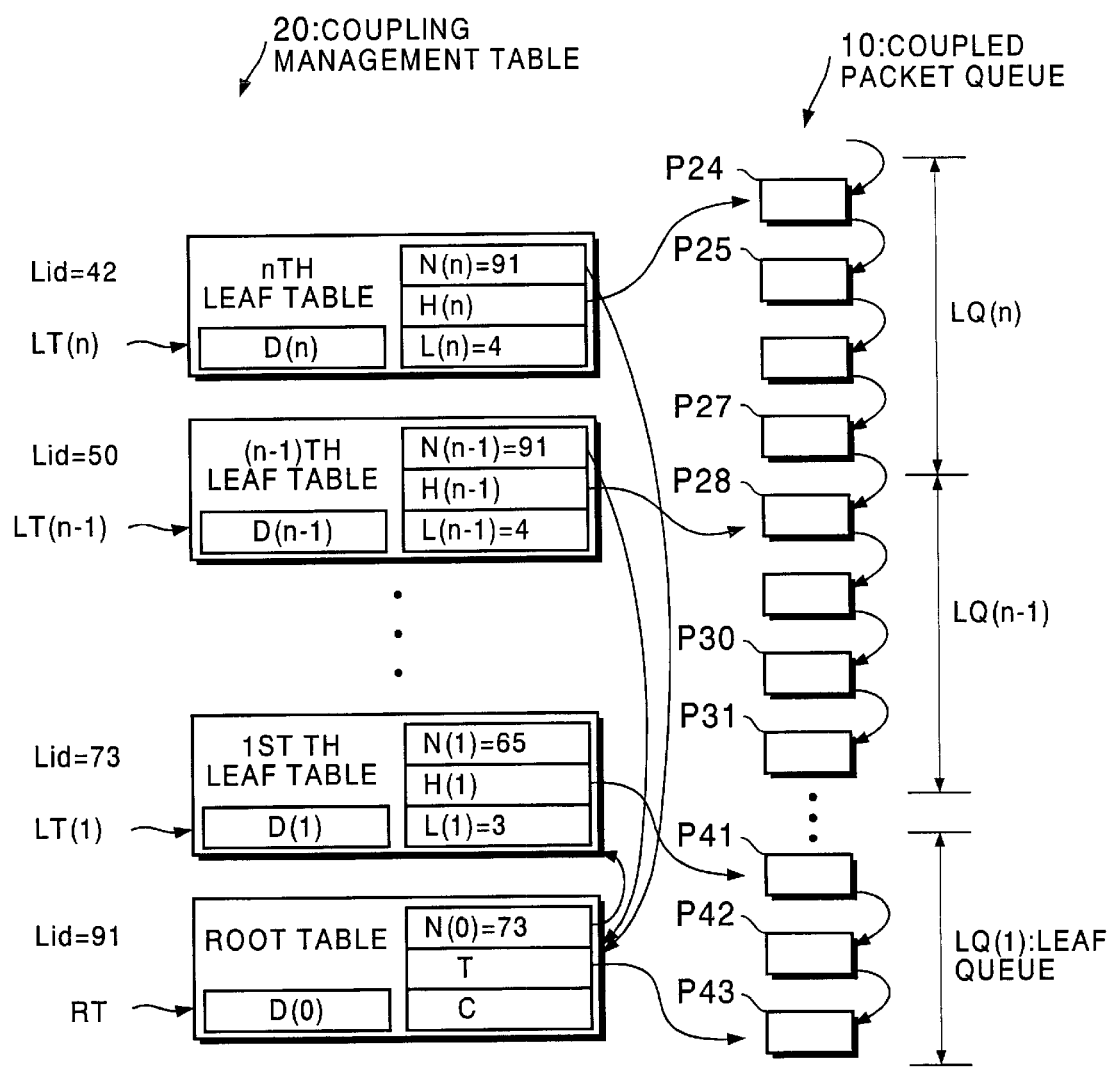
FIG. 4 is a diagram that shows the status after separating the n-th leaf queue from a coupled packet queue for the purpose of deleting the n-th leaf queue located at the downstream end in the packet buffer device shown in FIG. 1.

After that, for the purpose of deleting the n-th leaf queue LQ(n) from the coupled packet queue 10, the packet buffer device changes information of the next pointer N(n−1) of the preceding leaf table LT(n−1) to be deleted to information of the next pointer N(n) of the leaf table LT(n) to be deleted (step S23). FIG. 4 is a diagram that shows the status after this processing to the coupled packet queue 10 of FIG. 1. As shown in FIG. 4, in this example, the next pointer N(n−1) of the leaf table LT(n−1) is replaced with 91 that is the value of the next pointer N(n) of the leaf table LT(n). This results in separating the leaf queue LQ(n) from the coupled packet queue 10.

After that, the packet buffer device prohibits renewal of the total number information C by the operation for the n-th leaf queue LQ(n) until all elements are removed from the n-th leaf queue LQ(n), i.e., during the period where the delete operation identifier D(0) remains 1 (step S24).

After that, the packet buffer device judges whether the length pointer L(n) of the leaf queue LQ(n) to be deleted has become "0" or not (step S25). If the length pointer L(n) has not yet become "0" (step S25: no), the packet buffer device holds the status of step S24. Meanwhile, elements stored in the leaf queue LQ(n) are sequentially sent out therefrom, and removed from the coupled packet queue 10.

On the other hand, when the length pointer L(n) has become "0" (step S25: yes), the delete operation identifier D(0) of the root table RT is returned to "0" (step S26), and the process of deleting the leaf queue LQ(n) is completed.

As explained above, in the packet buffer device according to the present embodiment, since the delete operation identifiers D(1) through D(m) are provided respectively for the leaf tables LT(1) through LT(m) forming the coupling management table 20 to indicate that the leaf queue LQ located next toward the upstream direction is under delete operation, in the case where the leaf queue LQ(n) should be deleted and the length pointer L(n)≠0, for example, it is possible to notify the leaf queue LQ(n−1) located at the next toward upstream direction that the leaf queue LQ(n) is under the process of deletion by setting the delete operation identifier D(n+1) of the leaf table LT(n+1) located at the next toward downstream direction to 1.

Further, when the number of elements of the leaf queue LQ(n+1) is "0", since the head pointer H(n+1) of the leaf table LT(n+1) is fixed by replacing the head pointer H(n+1) of the leaf table LT(n+1) with the head pointer H(n), it is possible to prevent that the head pointer H(n+1) remains indefinite due to no elements having ever been accumulated in the leaf queue LQ(n+1).

Moreover, while the delete operation identifier D(n+1) is set to 1, i.e., while any element exists in the leaf queue LQ(n), the leaf table LT(n−1) is prohibited to determine the head pointer H(n+1) (renewal is allowed). That is, in case of transferring an element from the leaf queue LQ(n) to the leaf queue LQ(n+1), the leaf queue LQ(n) may fix the head pointer H(n+1) without problems. However, in case of transferring an element from the leaf queue LQ(n−1) to the leaf queue LQ(n+1), if the leaf queue LQ(n−1) fix the head pointer H(n+1), there occurs the problem that the element of the leaf queue LQ(n) cannot be linked to the coupled packet queue 10, as explained with the existing technique. Therefore, in such case, until the length pointer L(n) of the leaf queue LQ(n) becomes zero, this embodiment prohibits the head pointer H(n+1) to point the element of the leaf queue LQ(n−1) when the element is transferred from the leaf queue LQ(n−1) to the leaf queue LQ(n+1). Therefore, it is prevented that the element of the leaf queue LQ(n) cannot be linked properly to the coupled packet queue 10.

In this manner, at the point where all elements are removed from the leaf queue LQ(n) to the leaf queue LQ(n+1), because of the continuity of link pointers of the coupled packet queue 10, the link pointer of the rear end element of the leaf queue LQ(n+1) results in pointing the leading element of the leaf queue LQ(n−1). Therefore, the same processing as the ordinary processing can be executed thereafter. In other words, according to this embodiment, the element of the leaf queue LQ(n−1) can be adequately connected to the leaf queue LQ(n+1) without breaking the pointer chain of the coupled packet queue 10.

Further, in the packet buffer device according to the embodiment, when the leaf queue LQ(n) to be deleted is located at the down stream end of the coupled packet queue 10, the number of elements accumulated in the leaf queue LQ(n) is subtracted from the total number information C of the root table RT, but as long as the delete operation identifier D(0) is 1, subtraction of the total number information is not effected even when an element is sent out from the leaf queue LQ(n) to be deleted. Therefore, consistency of the total number information C after deletion is maintained. That is, prior to judging whether the tail pointer T of the root table RT is definite or indefinite, the total number of elements contained in the leaf queue LQ(n) is subtracted from the total number information C, which is the number of all elements of the coupled packet queue 10. Therefore, it is prevented that the packet buffer device erroneously judges the tail pointer T as being definite although actually being indefinite.

Figure 5:
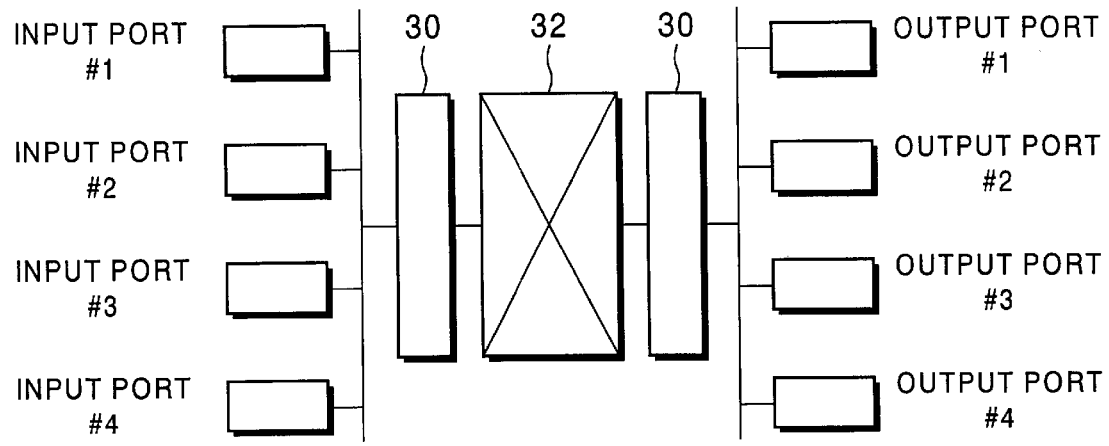
FIG. 5 is a block diagram that shows configuration of a packet switching device having packet buffer devices according to the embodiment at front and rear stages of a routing switch.
Figure 6:
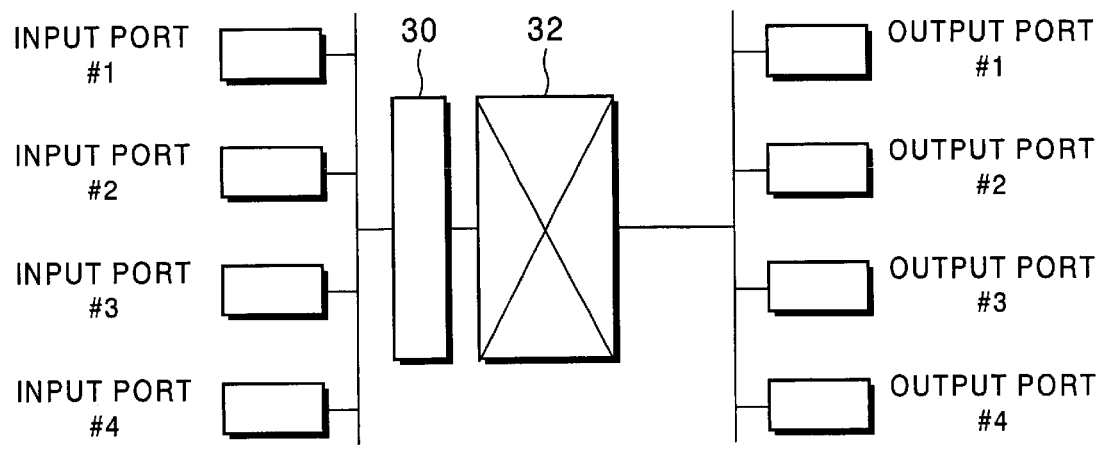
FIG. 6 is a block diagram that shows configuration of a packet switching device having a packet buffer device according to the embodiment at the front stage of a routing switch.
Figure 7:
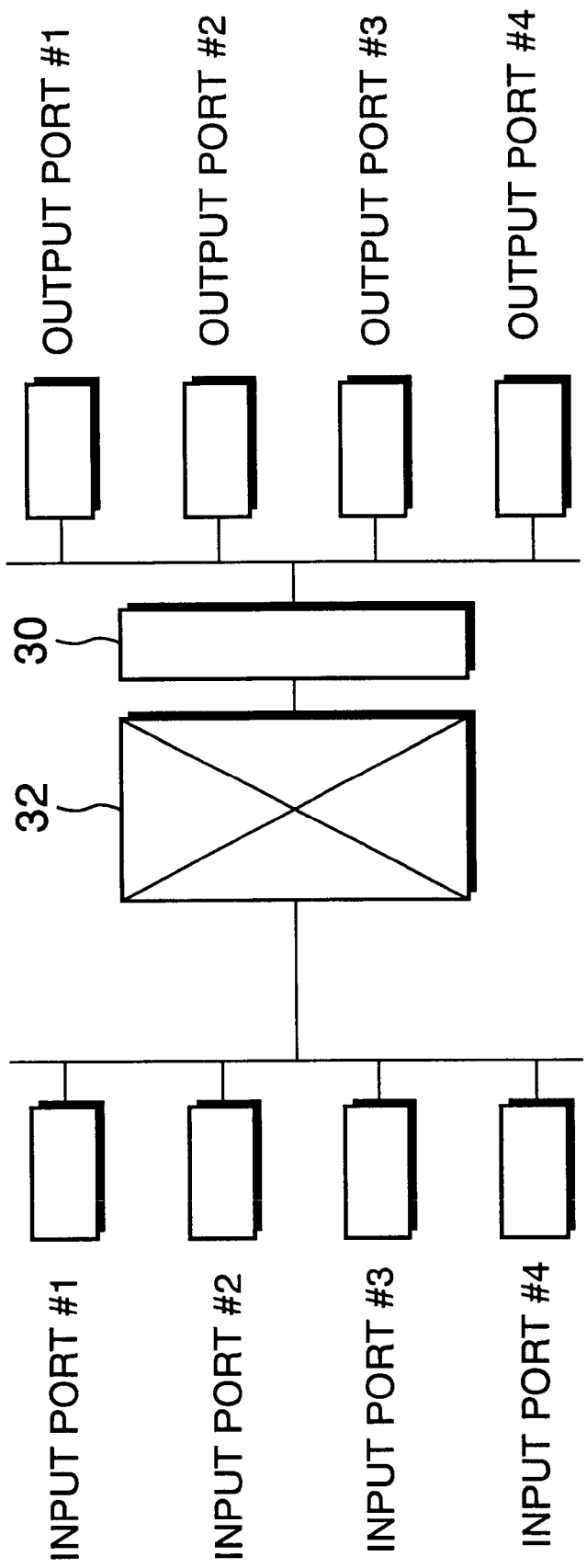
FIG. 7 is a block diagram that shows configuration of a packet switching device having a packet buffer device according to the embodiment at the rear stage of a routing switch.
Figure 8:
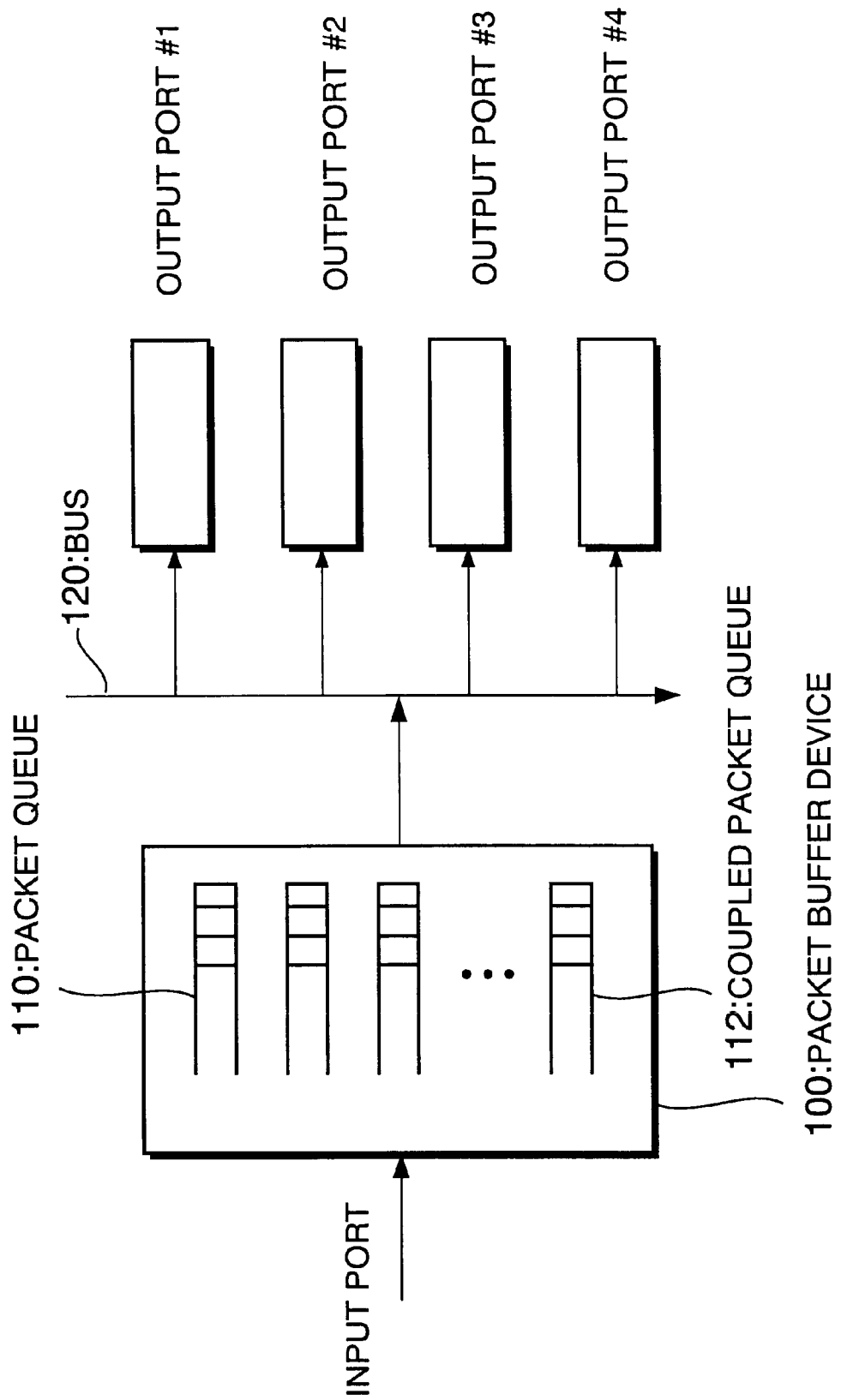
FIG. 8 is a block diagram that shows partial configuration of an existing packet switch.
Figure 9:
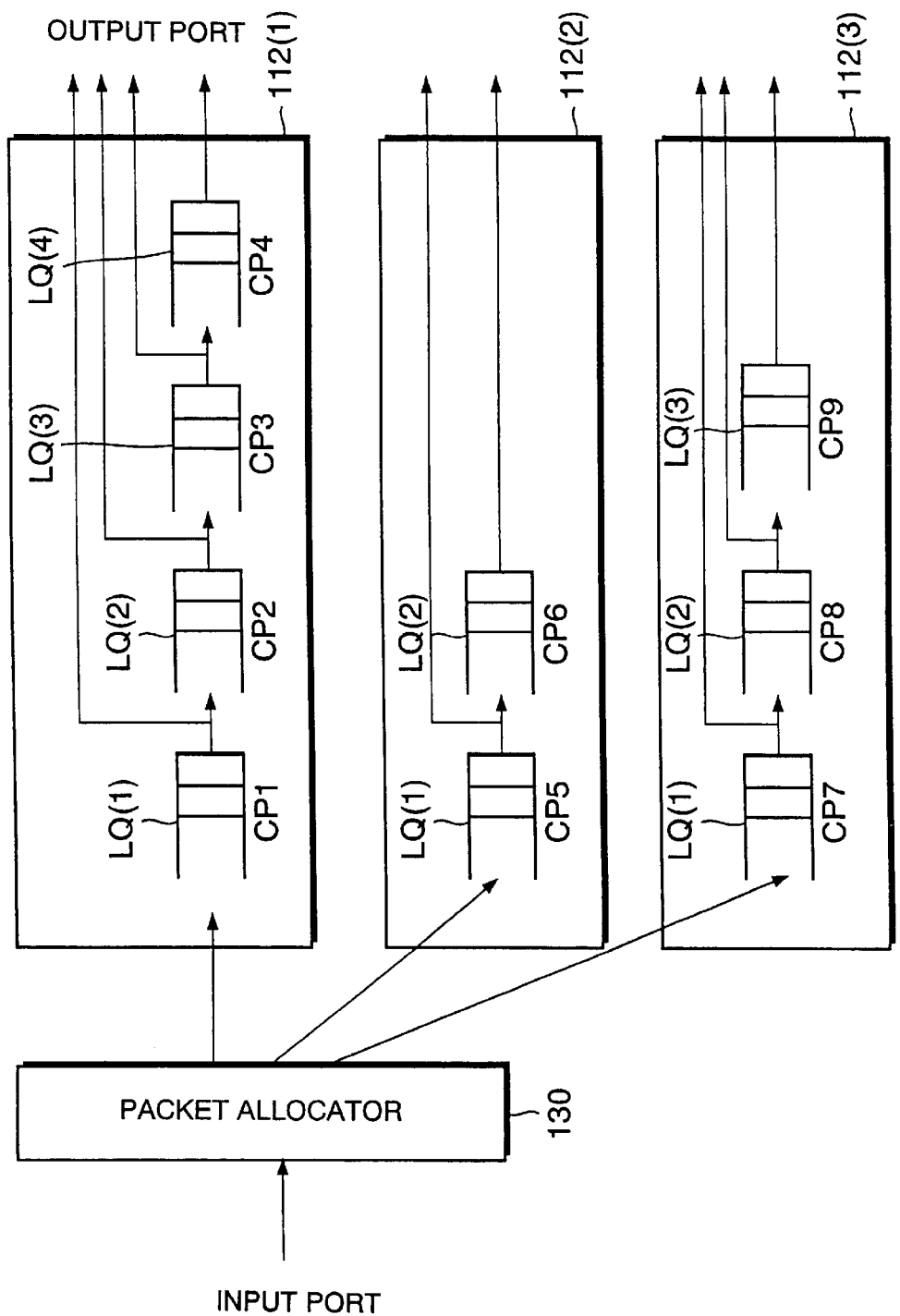
FIG. 9 is a block diagram that shows configuration of coupled packet queues formed in a packet buffer device.
Figure 10:
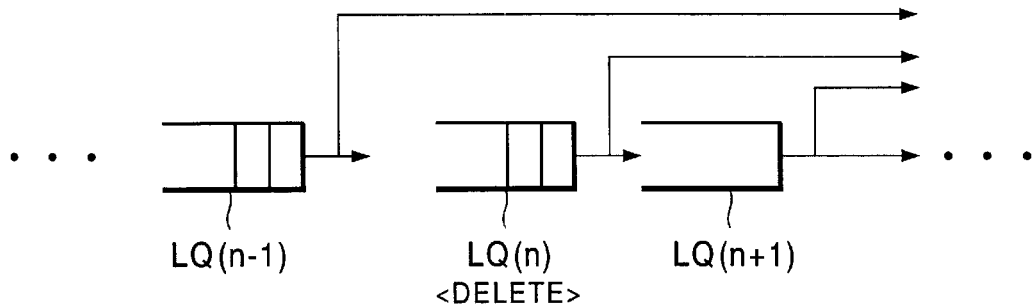
FIG. 10 is a diagram that shows a status where no elements have ever been accumulated in the (n+1)th leaf queue located next toward the downstream direction upon deleting the n-th leaf queue in a coupled packet queue.
Figure 11:
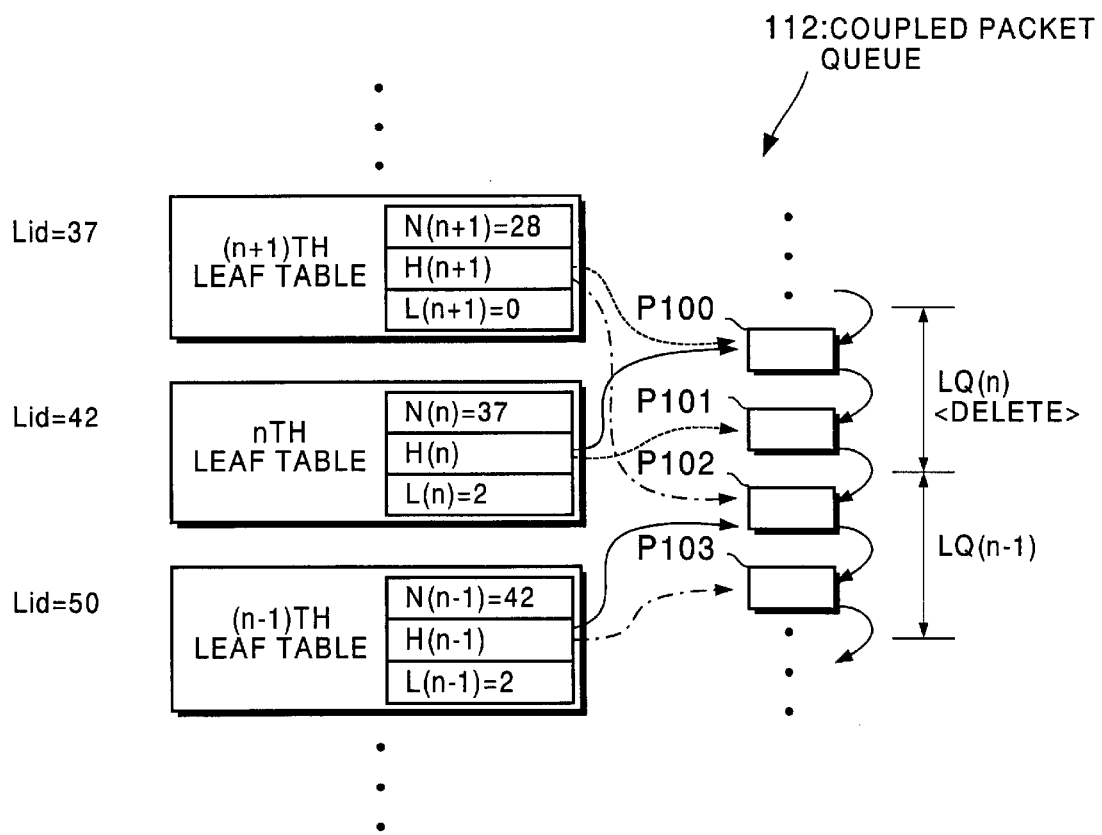
FIG. 11 is a diagram that explains a problem that occurs under the condition shown in FIG. 10, based on leaf tables and a coupled packet queue.
Figure 12:
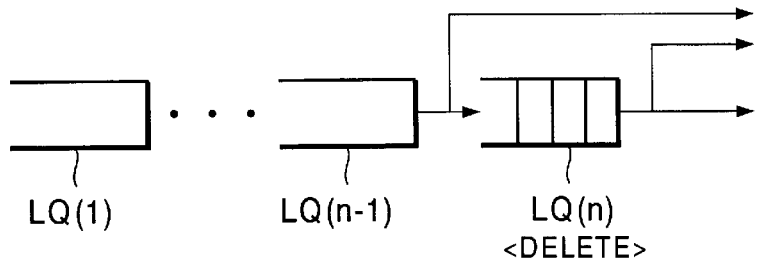
FIG. 12 is a diagram that shows a status where no elements have ever been accumulated in the first to (n−1)th leaf queues upon deleting the n-th leaf queue in a coupled packet queue.
Figure 13:
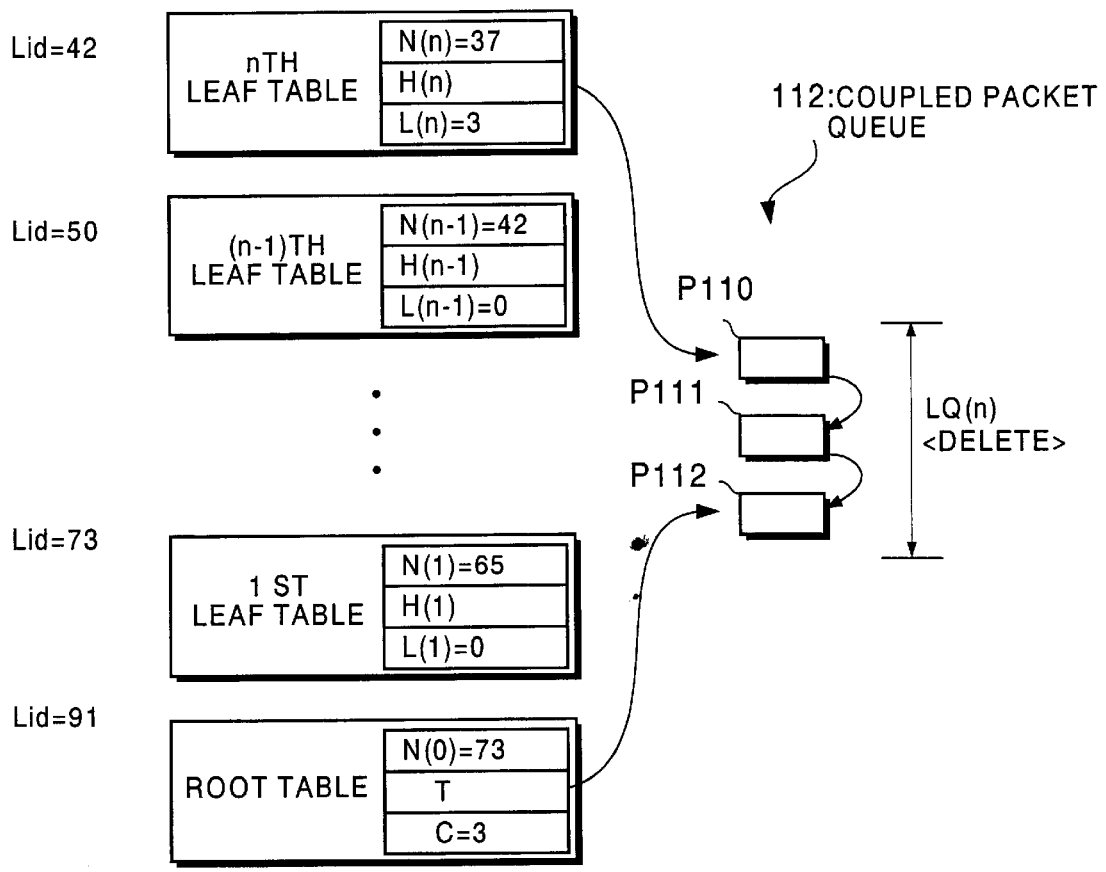
FIG. 13 is a diagram that explains a problem that occurs under the condition shown in FIG. 10, based on leaf tables and a coupled packet queue.

FIG. 5 is a diagram that shows a packet switching device having the packet buffer devices 30 at the front and rear stages of a routing switch device 32. FIG. 6 is a diagram that shows an input buffer type packet switching device having the packet buffer device 30 at the front stage of the routing switch device 32. FIG. 7 is a diagram that shows an output buffer type packet switching device having the packet buffer device 30 at the rear stage of the routing switch device 32. The packet buffer device 30 according to the embodiment can be used in various types of packet switching device like those examples.

The invention is not limited to the above-explained embodiment but can be modified in various modes. For example, although the foregoing embodiment has been explained as accumulating packets in the packet buffer device, these packets may be any of IP packets under Internet protocol, ATM cells in ATM communications, and so on.

Moreover, in the foregoing embodiment, the delete operation identifiers D(0) through D(m) are provided in the root table RT and leaf tables LT(1) through LT(m), respectively. However, the delete operation identifiers D(0) through D(m) form a single compiled table to store delete operation information.

Further, although the foregoing embodiment has been explained as realizing respective procedures with hardware, they may be realized with software. In case of using software, individual procedures explained in the foregoing embodiment can be distributed in form of recording mediums by recording the program for executing these procedures on recording mediums like diskettes, CD-ROM (compact-disc read-only-memory), ROM, memory cards, or the like. In this case, a recording medium storing the program may be read into a packet switching device and executed thereby to realize the embodiment explained above.

The packet switching device may be equipped with an operating system and any other programs like application programs, for example. In this case, using other programs equipped in the packet switching device, an instruction for invoking a program realizing a process equivalent to that of the instant embodiment from the programs in the packet switching device may be recorded on a recording medium.

The program can be distributed in form of carrier waves through a network instead of the form of a recording medium. The program transmitted in form of carrier waves on a network can be introduced into a packet switching device, and the foregoing embodiment can be realized by executing the program.

Furthermore, upon recording programs on recording mediums or transmitting them as carrier waves on networks, the programs are often code or compressed. In those cases, the packet switching device having introduced the program from such a recording medium or a carrier wave has to decode or expand the program before executing the program.

As described above, according to the invention, since the leaf table corresponding to the leaf queue located next to the leaf queue to be deleted toward the upstream direction detects that the leaf queue located next toward the downstream direction is under delete operation, the leaf table corresponding to the leaf queue located next to that to be deleted toward the upstream direction can recognize that the leaf queue located next toward the downstream direction is under the process of deletion.

What is claimed is:

1. A packet buffer device comprising:
  a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially sent out from the copy destinations belonging to the common flow;

a coupling management table having a plurality of leaf tables individually associated with and prepared for the individual leaf queues to manage elements accumulated in the coupled packet queue; and a detector configured to cause the leaf table, which is associated with the leaf queue located next to the leaf queue to be deleted toward the upstream direction to detect that the leaf queue to be deleted next toward the downstream direction is under delete operation, when the leaf queue to be deleted is performing a deleting process, wherein the detector includes delete operation identifiers for the leaf queues, respectively, the delete operation identifiers indicating that the leaf queues are under the delete operation.

2. The packet buffer device according to claim 1 wherein the delete operation identifiers are individually provided in the individual leaf tables, which are next to the individual leaf tables associated with the leaf queues to be indicated as being under delete operation toward the downstream direction.

3. The packet buffer device according to claim 2 wherein the delete operation identifier of one of the leaf queues at the down stream end of the coupled packet queue is provided in a root table different from the leaf tables.

4. The packet buffer device according to claim 1 wherein the coupling management table includes a head pointer for pointing to an element accumulated at the head of the leaf queue, when any element is contained in the Ieaf queue.

5. The packet buffer device according to claim 4 wherein, when no element is accumulated in the leaf queue located next to the leaf queue to be deleted toward the downstream direction, the value of the head pointer of the leaf table to be deleted substitutes into the bead pointer of the leaf table located next to the leaf queue to be deleted toward the downstream direction.

6. The packet buffer device according to claim 5 wherein, when the leaf queue located next toward the downstream direction is detected to be under delete operation by the detector, it is prohibited that an element heretofore located at the head of the leaf queue next to the leaf queue to be deleted toward the upstream direction is changed as the head pointer of the leaf queue next to the leaf queue to be deleted toward the downstream direction.

7. The packet buffer device according to claim 6 wherein it is prohibited that an element is transferred from the leaf queue next to the leaf queue to be deleted toward the upstream direction to the leaf queue to be deleted.

8. The packet buffer device according to claim 1 wherein the coupling management table includes total number information that indicates die total number of elements accumulated in the coupled packet queue.

9. The packet buffer device according to claim 8 wherein to total number information is provided in a root table different from the leaf tables.

10. The packet buffer device according to claim 8 which further comprises a subtracter configured to subtract the number of elements accumulated in the leaf queue to be deleted from the total number information, when the leaf queue to be deleted is located at the downstream end of the coupled packet queue.

11. The packet buffer device according to claim 10 wherein, after to subtracter has subtracted, the number of elements sent out from the leaf queue to be deleted is no longer subtracted from the total number information even if the leaf queue to be deleted sends out elements.

12. The packet buffer device according to claim 11 wherein it is prohibited that an element is transferred from the leaf queue next to the leaf queue to be deleted toward the upstream direction to the leaf queue to be deleted.

13. A packet buffer device comprising:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially sent out from the copy destinations belonging to the common flow;

a coupling manager configured to manage elements accumulated in the coupled packet queue and having a total number information storage to be stored the total number of elements accumulated in the coupled packet queue;

a subtractor configured to subtract the number of elements accumulated in the leaf queue to be deleted from the total number information stored in the total number information storage, when the leaf queue to be deleted is located at the downstream end of the coupled packet queue and the leaf queue to be deleted is performing a deleting process; and a detector configured to cause the leaf table, which is associated with the leaf queue located next to the leaf queue to be deleted toward the upstream direction, to detect that the leaf queue to be deleted next toward the downstream direction is under delete operation, when the leaf queue to be deleted is performing a deleting process, wherein the detector includes delete operation identifiers for the leaf queues, respectively, the delete operation identifiers indicating that the leaf queues are under the delete operation, respectively.

14. The packet buffer device according to claim 13 wherein the coupling manager comprises plurality of leaf tables individually associated with and prepared for the individual leaf queues.

15. The packet buffer device according to claim 14 wherein the total number information storage is provided in a root table different from the leaf tables.

16. The packet buffer device according to claim 13 wherein, after the subtractor has subtracted, the number of elements sent out from the leaf queue to be deleted is no longer subtracted from the total number information stored in the total number information storage even if the leaf queue to be deleted sends out elements.

17. The packet buffer device according to claim 13 wherein it is prohibited that an element is transferred from the leaf queue next to the leaf queue to be deleted toward the upstream direction to the leaf queue to be deleted.

18. A packet switching device comprising:

a routing switch configured to switch each inputted packet, based on header information contained in the packet; and at least one packet buffer device provided in front stage and/or rear stage of the routing switch, wherein the packet buffer device including:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially sent out from the copy destinations belonging to the common flow;

a coupling management table having a plurality of leaf tables individually associated with and prepared for the individual leaf queues to manage elements accumulated in the coupled packet queue; and a detector configured to cause the leaf table, which is associated with the leaf queue located next to the leaf queue to be deleted toward the upstream direction, to detect that the leaf queue to be deleted next toward the downstream direction is under delete operation, when the leaf queue to be deleted is performing a deleting process, wherein the detector includes delete operation identifiers for the leaf queues, respectively, the delete operation identifiers indicating that the leaf queues are under the delete operation, respectively.

19. A packet switching device comprising:

a routing switch configured to switch each inputted packet, based on header information contained in the packet; and at least one packet buffer device provided in front stage and/or rear stage of the routing switch, wherein the packet buffer device including:

a coupled packet queue prepared for each flow, the coupled packet queue having a plurality of leaf queues individually formed for individual copy destinations belonging to a common flow to accumulate packets as elements and sequentially transfer elements sent out from one of the leaf queues located upstream to one of the leaf queues located downstream such that packets are sequentially sent out from the copy destinations belonging to the common flow;

a coupling manager configured to manage elements accumulated in the coupled packet queue and having a total number information storage to be stored the total number of elements accumulated in the coupled packet queue;

a subtractor configured to subtract the number of elements accumulated in the leaf queue to be deleted from the total number information stored in the total number information storage, when the leaf queue to be deleted is located at the downstream end of the coupled packet queue and the leaf queue to be deleted is performing a deleting process; and a detector configured to cause the leaf table, which is associated with the leaf queue located next to the leaf queue to be deleted toward the upstream direction, to detect that the leaf queue to be deleted next toward the downstream direction is under delete operation, when the leaf queue to be deleted is performing a deleting process, wherein the detector includes delete operation identifiers for the leaf queues, respectively, the delete operation identifiers indicating that the leaf queues are under the delete operation, respectively.

* * * * *